(12) United States Patent
Taylor et al.

(10) Patent No.: US 11,210,651 B2
(45) Date of Patent: *Dec. 28, 2021

(54) SYSTEMS AND METHODS TO USE IMAGE DATA TO PERFORM AUTHENTICATION

(71) Applicant: Sony Interactive Entertainment Inc., Tokyo (JP)

(72) Inventors: Michael Taylor, San Mateo, CA (US); Glenn Black, San Mateo, CA (US); Javier Fernandez Rico, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,048

(22) Filed: May 8, 2020

(65) Prior Publication Data

US 2020/0265411 A1 Aug. 20, 2020

Related U.S. Application Data

(63) Continuation of application No. 16/044,804, filed on Jul. 25, 2018, now Pat. No. 10,664,825.

(51) Int. Cl.
*G06Q 20/32* (2012.01)
*G06F 3/01* (2006.01)
*G06K 9/00* (2006.01)

(52) U.S. Cl.
CPC .......... *G06Q 20/327* (2013.01); *G06F 3/017* (2013.01); *G06K 9/00355* (2013.01)

(58) Field of Classification Search
None
See application file for complete search history.

(56) References Cited

U.S. PATENT DOCUMENTS

| | | | |
|---|---|---|---|
| 10,664,825 B2* | 5/2020 | Taylor | ............... G06K 9/00892 |
| 2014/0232635 A1* | 8/2014 | Lee | ...................... G06F 3/0304 |
| | | | 345/156 |
| 2015/0081544 A1 | 3/2015 | Schulz et al. | |
| 2018/0114330 A1* | 4/2018 | Wexler | ................... G06F 3/011 |
| 2018/0196510 A1 | 7/2018 | Liu et al. | |
| 2018/0198783 A1 | 7/2018 | Liu et al. | |
| 2019/0354170 A1 | 11/2019 | Rosedale | |
| 2019/0354189 A1 | 11/2019 | Rosedale | |
| 2019/0356745 A1 | 11/2019 | Rosedale | |
| 2019/0377417 A1* | 12/2019 | Friedman | ................ G06F 3/017 |

* cited by examiner

*Primary Examiner* — Justin P. Misleh
(74) *Attorney, Agent, or Firm* — John L. Rogitz (57) ABSTRACT

Image data from two different devices is used to identify a physical interaction between two users to authenticate a digital interaction between the users.

10 Claims, 5 Drawing Sheets

SYSTEMS AND METHODS TO USE IMAGE DATA TO PERFORM AUTHENTICATION

FIELD

The application relates generally to technically inventive, non-routine solutions that are necessarily rooted in computer technology and that produce concrete technical improvements.

BACKGROUND

Users of consumer electronics devices sometimes like to engage in an electronic interaction, such as passing control of the digital rights to a video game from one user to another user. As recognized herein, these sorts of electronic interactions may be authenticated electronically to validate the interaction, confirm agreement between the users, and avoid hacking attempts. However, as also recognized herein, current methods of electronic authentication can be cumbersome and might not be very intuitive to the average person. There are currently no adequate solutions to the foregoing computer-related, technological problem.

SUMMARY

As understood herein, images that were generated at or near the same time by each user's device may be used to identify a physical interaction between the users at a given geographical location. The physical interaction may be, for instance, a handshake. This physical interaction, once identified, can then be used as a way to authenticate an electronic interaction between the users.

Accordingly, in one aspect a device includes at least one processor and at least one computer storage with instructions executable by the at least one processor. The instructions are executable to receive at least a first image from a first camera and receive at least a second image from a second camera. The instructions are also executable to receive time-related metadata for the first image and the second image. The instructions are further executable to identify a gesture performed between a first user and a second user based on the first and second images and based on the time-related metadata, and to perform authentication based on the identification of the gesture.

In some examples, the gesture performed between the first and second users may be identified by identifying a pre-defined gesture indicated in both the first and second images and identifying the first and second images as both being generated at a particular time or within a threshold time of each other, as indicated in the time-related metadata. Also in some examples, the gesture performed between the first and second users may be identified by identifying the first image and the second image as being generated at a same location or by respective user devices while the user devices are within a threshold distance of each other.

Additionally, or alternatively, the gesture performed between the first and second users may be identified by identifying the first image and the second image as showing a same physical interaction between the first and second users, but from different angles. The physical interaction may be a handshake or a high-five between the users.

The authentication itself may be in relation to exchange of a digital asset. Additionally, in some example implementations, the device having the computer storage with the instructions may be a headset. In other example implementations, the device may be a server, with the server communicating with respective user devices from which the first and second images are respectively received.

In another aspect, a computer-implemented method includes receiving a first set of images from a first camera and a second set of images from a second camera. The method also includes identifying a physical interaction between a first user and a second user based on the first set of images and identifying the physical interaction between the first user and the second user based on the second set of images. The method further includes, based on identifying the physical interaction based on both the first set of images and the second set of images, authenticating an electronic interaction between the first user and the second user.

In yet another aspect, an apparatus includes at least one computer memory that includes instructions executable by at least one processor to identify a physical interaction between a first user and a second user, with the physical interaction being identified based on data from two different devices each imaging the physical interaction. The instructions are also executable to, based on the identification, authenticate a digital interaction between the first user and the second user.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, and machine learning applications.

A system herein may include server and client components, connected over a network such that data may be exchanged between the client and server components. The client components may include one or more computing devices including AR headsets, VR headsets, game consoles such as Sony PlayStation® and related motherboards, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more programs/applications, such as a browser made by Microsoft or Google or Mozilla or other browser program that can access websites hosted by the Internet servers discussed below. Also, an operating environment according to present principles may be used to execute one or more computer game programs/applications and other programs/applications that undertake present principles.

Servers and/or gateways may include one or more processors executing instructions that configure the servers to receive and transmit data over a network such as the Internet. Additionally or alternatively, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users in accordance with present principles.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

As indicated above, present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, an augmented reality (AR) headset, a virtual reality (VR) headset, Internet-enabled or "smart" glasses, another type of wearable computerized device such as a computerized Internet-enabled watch, a computerized Internet-enabled bracelet, a computerized Internet-enabled music player, computerized Internet-enabled head phones, a computerized Internet-enabled implantable device such as an implantable skin device, other computerized Internet-enabled devices, etc. Regardless, it is to be understood that the AVD 12 is configured to undertake present principles (e.g., communicate with other consumer electronics (CE) devices to undertake present principles, execute the logic described herein, and perform any other functions and/or operations described herein).

Figure 1:
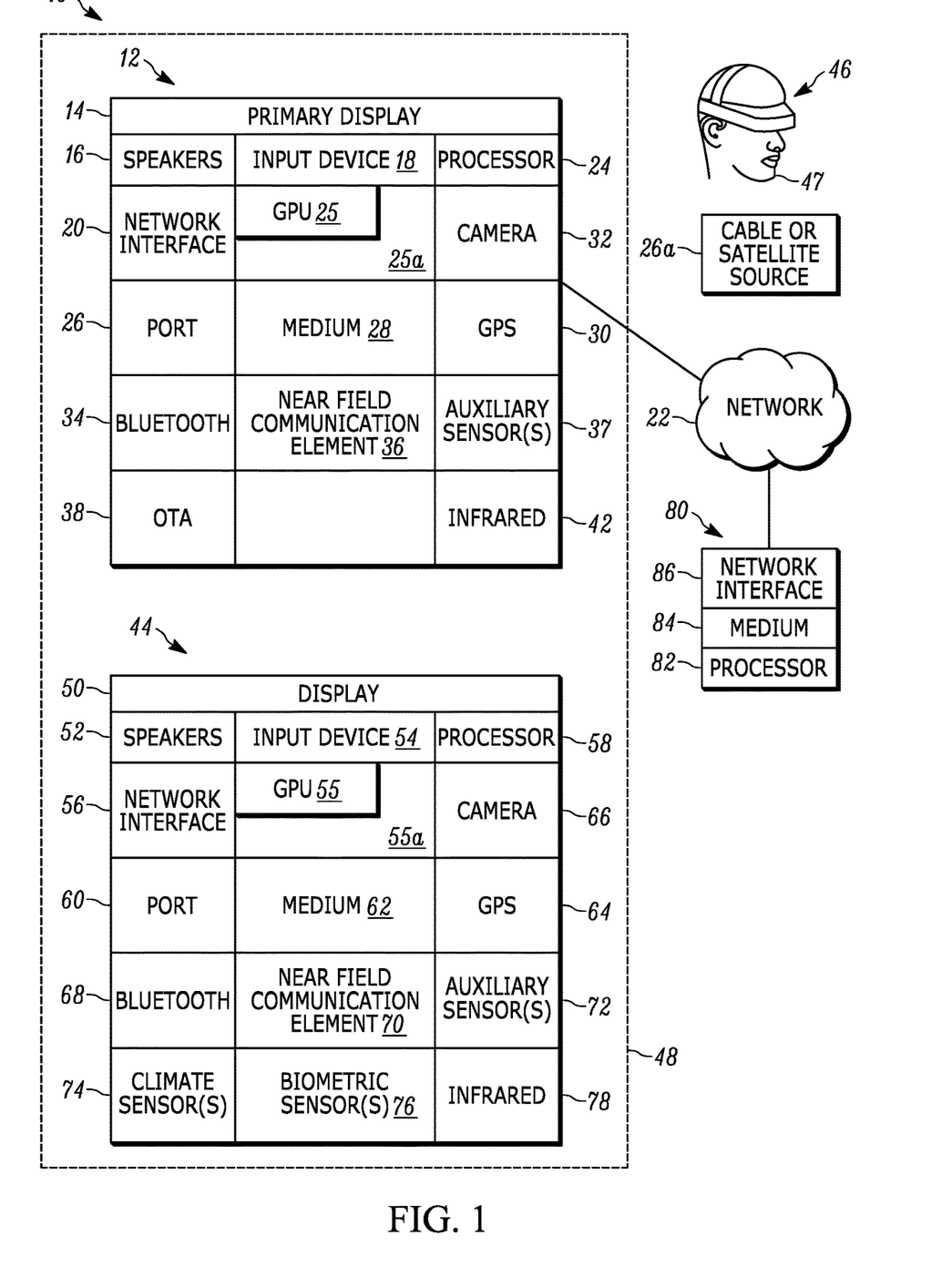
FIG. 1 is a block diagram of an example system consistent with present principles.

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors. Thus, the interface 20 may be, without limitation, a Wi-Fi transceiver, which is an example of a wireless computer network interface, such as but not limited to a mesh network transceiver. Furthermore, note the network interface 20 may be, e.g., a wired or wireless modem or router, or other appropriate interface such as, for example, a wireless telephony transceiver, or Wi-Fi transceiver as mentioned above, etc.

It is to be understood that the one or more processors control the AVD 12 to undertake present principles, including the other elements of the AVD 12 described herein such as controlling the display 14 to present images thereon and receiving input therefrom. The one or more processors may include a central processing unit (CPU) 24 as well as a graphics processing unit (GPU) 25 on a graphics card 25A.

In addition to the foregoing, the AVD 12 may also include one or more input ports 26 such as, e.g., a high definition multimedia interface (HDMI) port or a USB port to physically connect (e.g., using a wired connection) to another consumer electronics (CE) device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to, e.g., receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to, for example, determine the location of the AVD 12 in all three dimensions.

Continuing the description of the AVD 12, in some embodiments the AVD 12 may include one or more cameras 32 that may be, e.g., a thermal imaging camera, a digital camera such as a webcam, an infrared (IR) camera, and/or a camera integrated into the AVD 12 and controllable by the processor 24 to generate pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other consumer electronics (CE) device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR or VR headset worn by a user 47 as shown. In the example shown, only two CE devices 44, 46 are shown, it being understood that fewer or greater devices may also be used in accordance with present principles. For example, principles below discuss multiple users 47 with respective headsets communicating with each other during interactions between the users discussed herein.

In the example shown, to illustrate present principles all three devices 12, 44, 46 are assumed to be members of a network such as a secured or encrypted network, an entertainment network or Wi-Fi in, e.g., a home 48, or at least to be present in proximity to each other in a certain location and able to communicate with each other and with a server as described herein. However, present principles are not limited to a particular location or network unless explicitly claimed otherwise.

The example non-limiting first CE device 44 may be established by any one of the above-mentioned devices, for example, a smart phone, a digital assistant, a portable wireless laptop computer or notebook computer or game controller (also referred to as "console"), and accordingly may have one or more of the components described below. The second CE device 46 without limitation may be established by an AR headset, a VR headset, "smart" Internet-enabled glasses, or even a video disk player such as a Blu-ray player, a game console, and the like. Still further, in some embodiments the first CE device 44 may be a remote control (RC) for, e.g., issuing AV play and pause commands to the AVD 12, or it may be a more sophisticated device such as a tablet computer, a game controller communicating via wired or wireless link with a game console implemented by another one of the devices shown in FIG. 1 and controlling video game presentation on the AVD 12, a personal computer, a wireless telephone, etc.

Accordingly, the first CE device 44 may include one or more displays 50 that may be touch-enabled for receiving user input signals via touches on the display 50. Additionally or alternatively, the display(s) 50 may be an at least partially transparent display such as an AR headset display or a "smart" glasses display or "heads up" display, as well as a VR headset display, or other display configured for presenting AR and/or VR images.

The first CE device 44 may also include one or more speakers 52 for outputting audio in accordance with present principles, and at least one additional input device 54 such as, for example, an audio receiver/microphone for entering audible commands to the first CE device 44 to control the device 44. The example first CE device 44 may further include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as, e.g., controlling the display 50 to present images thereon and receiving input therefrom. Furthermore, note that the network interface 56 may be, for example, a wired or wireless modem or router, or other appropriate interface such as a wireless telephony transceiver, or Wi-Fi transceiver as mentioned above, etc.

Still further, note that in addition to the processor(s) 58, the first CE device 44 may also include a graphics processing unit (GPU) 55 on a graphics card 55A. The graphics processing unit 55 may be configured for, among other things, presenting AR and/or VR images on the display 50.

In addition to the foregoing, the first CE device 44 may also include one or more input ports 60 such as, e.g., a HDMI port or a USB port to physically connect (e.g., using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to, e.g., receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to, e.g., determine the location of the first CE device 44 in all three dimensions.

Continuing the description of the first CE device 44, in some embodiments the first CE device 44 may include one or more cameras 66 that may be, e.g., a thermal imaging camera, an IR camera, a digital camera such as a webcam, and/or another type of camera integrated into the first CE device 44 and controllable by the CE device processor 58 to generate pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first CE device 44 may include still other sensors such as, for example, one or more climate sensors 74 (e.g., barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more solid state storage drives (SSDs). The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as a wireless telephony transceiver. The network interface 86 may be a remote direct memory access (RDMA) interface that directly connects the medium 84 to a network such as a so-called "fabric" without passing through the server processor 82. The network may include an Ethernet network and/or fiber channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm", and may include and perform "cloud" functions such that the devices of the system 10 may access a "cloud" environment via the server 80 in example embodiments for, e.g., authentication as described herein as well as for network gaming applications, digital assistant applications, etc. Additionally, or alternatively, the server 80 may be implemented by one or more game consoles or other computers in the same room as the other devices shown in FIG. 1 or nearby.

Figure 2:
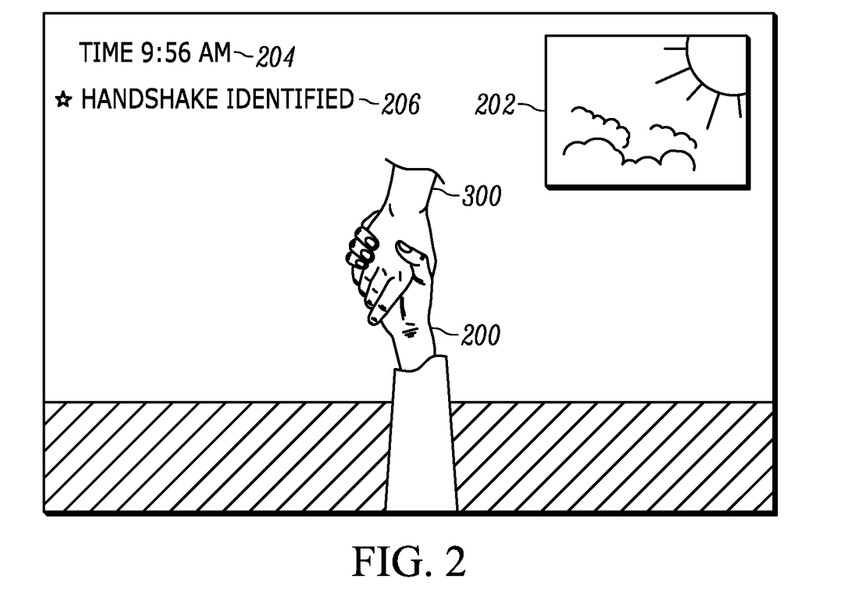
FIGS. 2 and 3 are example illustrations consistent with present principles.
Figure 3:
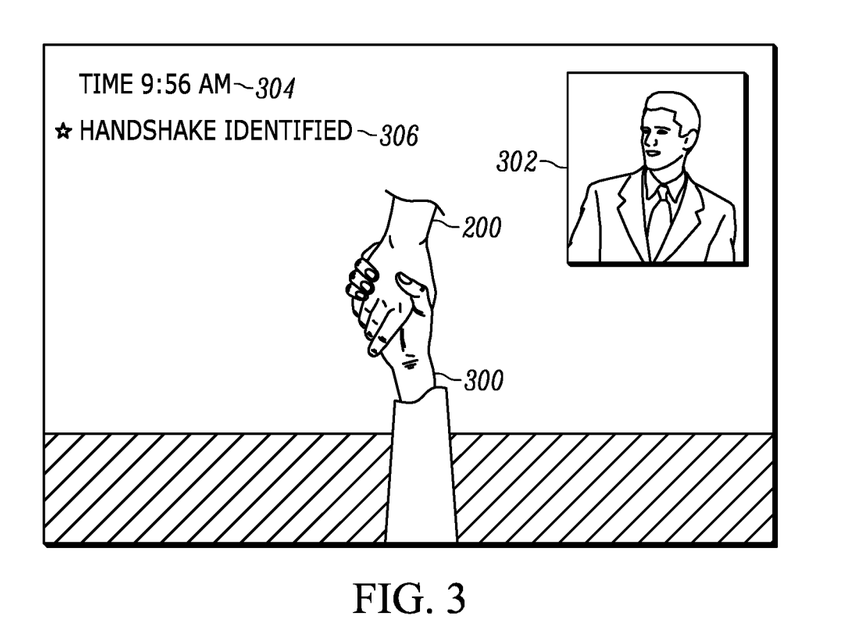

Now in cross-reference to FIGS. 2 and 3, these figures are understood to correspond to the respective views of first and second users through respective transparent displays of respective augmented reality (AR) headsets and/or "smart glasses" being worn by the users. Specifically, FIG. 2 shows the perspective from the first user, while FIG. 3 shows the perspective from the second user. Furthermore, note that while the views shown in FIGS. 2 and 3 are understood to be views through the transparent displays of the respective AR headsets, it is to be understood that present principles may also apply while the first and second users are physically interacting while engaged in a virtual reality (VR) experience rather than an AR/smart glasses experience.

In any case, note that the views that are shown in these figures may also be captured by cameras on the respective headsets in accordance with present principles, with the respective views as captured by the cameras understood to be the same or similar to the actual views of the users while wearing the respective headsets owing to the juxtaposition of the respective cameras on the headsets at certain locations to correspond to the actual user views. For instance, the cameras may be respectively juxtaposed on the bridge of the headsets between the eyes and over the nose. In some examples, the camera images may be single still images from each respective headset, while in other examples they may be video streams/sets of images from each headset.

As may be appreciated from both of FIGS. 2 and 3, an arm 200 of the first user and an arm 300 of the second user are shown as physically interacting with each other via skin-to-skin contact between respective right hands of the users. FIG. 2 shows this physical interaction from a first viewing angle corresponding to the first user's perspective, while FIG. 3 shows this same physical interaction from a second viewing angle offset from the first viewing angle and corresponding to the second user's perspective. The difference in viewing angles may be appreciated from the differing paintings 202 and 302 in the respective fields of view for the users.

As also shown in both of FIGS. 2 and 3, a time 204, 304 is indicated on the respective displays of the headsets. The respective displays may also present respective indications

206, 306 that a handshake gesture has been identified by each respective headset, or by a server in communication with the respective headset and to which corresponding camera images have been provided.

Figure 4:
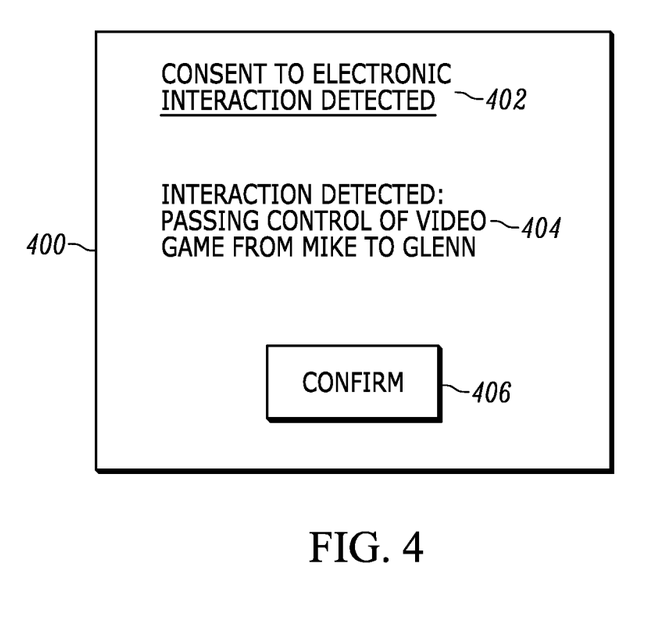
FIGS. 4 and 6 are example graphical user interfaces consistent with present principles.

Then, in some examples and responsive to the identification of the handshake based on the data/images generated at both headsets, a graphical user interface (GUI) 400 as shown in FIG. 4 may be presented on the display of each headset. However, the GUI 400 may also be presented on a respective separate device of each user that is in communication with the headset of the respective user, such as a respective smart phone of each user that communicates with the respective user's headset.

The GUI 400 itself may include an indication 402 that a user's consent to an electronic or digital interaction has been detected via the identified handshake. One example of an electronic interaction may be passing control of, passing the rights to use, or passing legal ownership over a particular video game stored electronically after being downloaded over the Internet. This may be done at least in part by transferring control or rights data between the users over a video game network or online store/marketplace to associate the control or rights data with a given profile for a user to which the video game is to be transferred.

Furthermore, note that the consideration for such an interaction (and indeed many of the other interactions disclosed herein) may be a cryptocurrency payment to the person giving up control, etc. of the video game. This may occur after the headset/device of the user that is to receive the cryptocurrency payment (the payee) as well as others in a peer-to-peer network validate by consensus that the other user (the payor) actually owns the cryptocurrency that is to be used for payment, e.g., as stored in a digital wallet of the payor. Other ways of validating that each party owns their consideration/digital asset that is to be provided to the other party may also be used.

In any case, other examples of electronic interactions include passing control of, passing the rights to use, or passing legal ownership over a particular avatar, video game character, AR/VR object, video game object such as a weapon from a first-person shooter video game, or other digital asset. This may also be done at least in part by transferring control or rights data between the users over a video game network or online store/marketplace to associate the control or rights data with a given profile for a user to which the digital asset is to be transferred. Additionally, note that in some examples passing control or passing the rights to use may include lending a digital asset to one of the users by the other user or trading digital assets between the users.

Still other examples of electronic interactions in accordance with present principles include electronic credit card transactions and other electronic monetary interactions, "pay now" and tap-to-pay RFID express-pay transactions, etc. Still other examples include electronically signing a contract or exchanging music files.

Still in reference to FIG. 4, in addition to the indication 402 the GUI 400 may also include text 404 that specifies the particular electronic interaction that was identified. In the example shown, the electronic interaction is passing control of a video game from the first user (Mike) to the second user (Glenn). The GUI 400 may also include a "confirm" selector 406 that is selectable using touch or cursor input to confirm consent to the electronic interaction and thereby provide another layer of authentication on top of the handshake itself. In some examples, each user should separately select the confirm selector 406 from the GUI 400 to confirm his or her consent to the electronic interaction and its terms as might also be presented on the GUI 400, with separate instances of the GUI 400 being presented on the display of each user's headset.

Figure 5:
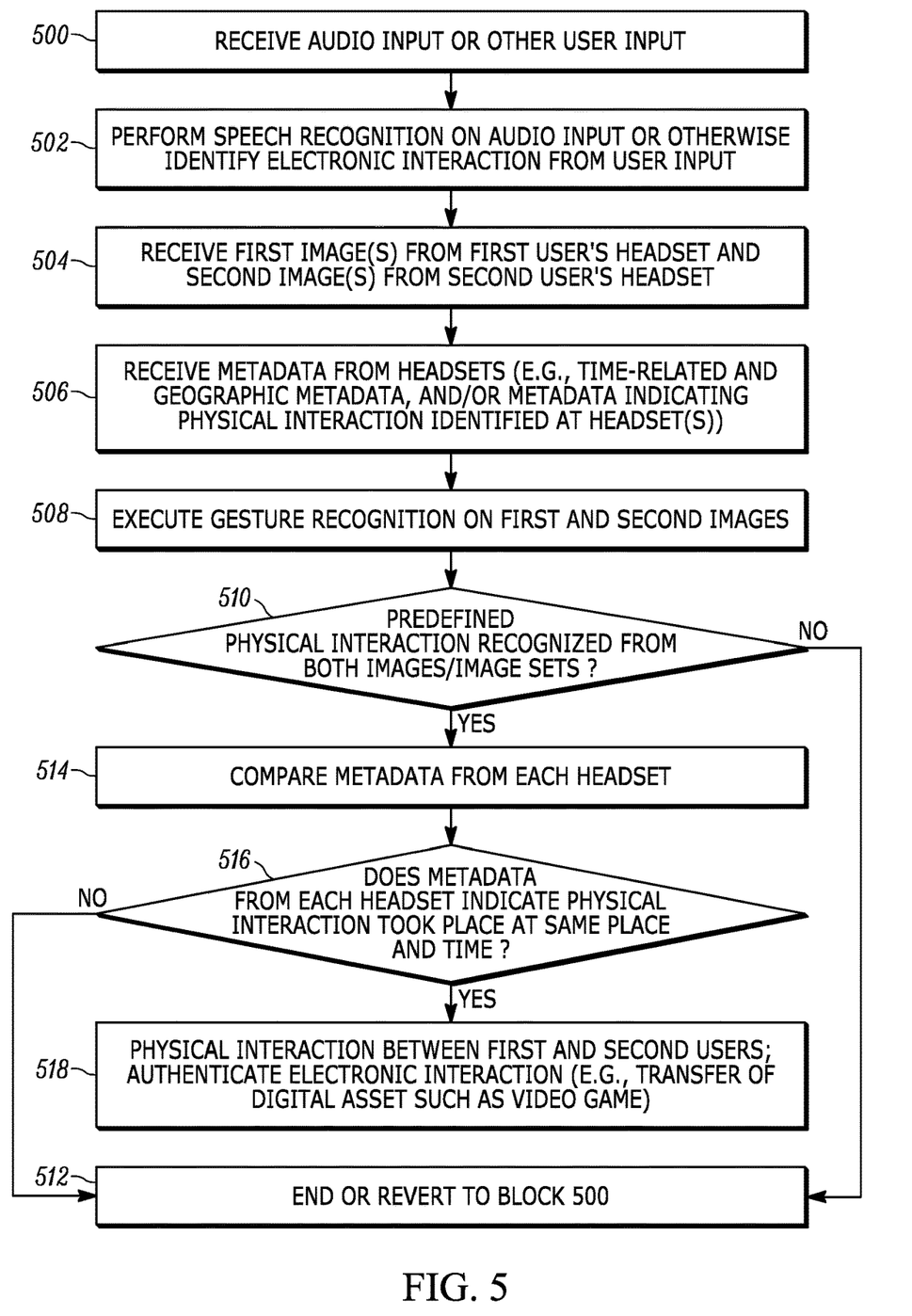
FIG. 5 is a flow chart of example overall logic consistent with present principles.

Continuing the detailed description in reference to FIG. 5, it shows overall logic consistent with present principles. The logic of FIG. 5 may be executed by a server, video gaming service, or cloud-based computing service in communication with the respective headsets of each user that is a party to a given electronic interaction. Additionally, or alternatively, the logic may be executed in whole or in part by one or more of the headsets themselves, or by other end-user devices in communication with the respective headsets such as respective smart phones of the users.

Beginning at block 500, the device executing the logic of FIG. 5 may receive audio input of the natural language the users that is transmitted or streamed from microphones on the respective users' headsets, e.g., over an encrypted communication channel. However, note that other user input may also be received at block 500, such as keyboard or mouse input or a verbal command indicating or initiating an electronic interaction itself. For instance, the keyboard or mouse input or verbal command may include a request to transfer a digital asset like a video game from the first user to the second user in exchange for a crypocurrency payment.

From block 500 the logic may then proceed to block 502. At block 502 the device may perform speech recognition on the audio input, such as natural language processing, to identify, via the audio input, the electronic interaction agreed to by the users while speaking to each other. At block 502 the device may even identify the parties to the electronic interaction via voice recognition performed on the audio input and also verify or validate that the respective parties own/control the digital asset(s) that they have each agreed to provide to the other party. The parties/users may also be identified based on, e.g., respective user profiles associated with each headset or based on peer to peer communication between the headsets to otherwise exchange user identification data.

Additionally or alternatively, at block 502 the device may use the other user input received at block 500 to identify the electronic interaction and parties to the electronic interaction. For instance, the device may process a user command to initiate an electronic interaction between certain parties, as received via text input or an audible command. Additionally, in some examples one or more of the headsets themselves may process the user command and then pass the command to the device undertaking the logic of FIG. 5 so that the device executing the logic of FIG. 5 may then identify the electronic interaction and parties to the electronic interaction.

After block 502 the logic may then proceed to block 504 where the device may receive a first image or set of images (e.g., video stream) from the first user's headset, and a second image or set of images from the second user's headset. The transmission of the first image(s) and the second image(s) from the respective headsets, and indeed any of the other communications discussed herein, may be via an encrypted communication channel. The first image(s) and second image(s) themselves may correspond to respective views of the users while wearing their respective headsets as described above in reference to FIGS. 2 and 3. In some embodiments, the images received at block 504 may even be used to identify the parties to the electronic interaction, such as by using facial recognition to identify the opposing party to the electronic interaction from an image or video stream showing the opposing party as generated at the other user/party's headset.

Then at block 506 the device may receive metadata from each user's headset, such as time-related metadata and geographic metadata, for each of the first image(s) and the second image(s). For instance, timestamp data for when the respective images were generated may be received, as well as GPS coordinates or other location data for where the respective images were generated. Other metadata may also be received at block 506, such as metadata indicating the physical interaction itself if identified at a respective headset using object/gesture recognition at the headset.

However, also note that in other embodiments the physical interaction may be identified by the device undertaking the logic of FIG. 5 using object/gesture recognition on the respective images once the respective images themselves are received from each headset. Thus, at block 508 the device undertaking the logic of FIG. 5 may itself execute object and/or gesture recognition on the first image(s) and the second image(s) to identify the physical interaction between the users. Then at decision diamond 510 the device may determine, based on the object/gesture recognition and/or based on the received metadata, whether the identified physical interaction matches a predefined physical interaction as stored in reference data.

Responsive to a negative determination at diamond 510, the logic may proceed to block 512 where the device may either end or revert back to block 500 and proceed therefrom. However, responsive to an affirmative determination at diamond 510, the logic may instead proceed to block 514. At block 514 the device may compare the time-related and geographic metadata from each headset that was received at block 506 to then determine, at decision diamond 516, whether the metadata indicates that the physical interaction from the respective first and second images took place at the same time and at the same place. Triangulation using the images from the headsets may also be used to determine that the physical interaction took place at the same place. If it is determined that the physical interaction took place at the same place and same time, this may establish that the physical interaction separately indicated in the first image(s) and the second image(s) is in fact the same physical interaction but from different angles or camera viewpoints. The "same place" reference above may be, for instance, a certain business establishment or building, a set of GPS coordinates, or a certain personal residence or street address.

Also note that in some embodiments at diamond 516 the logic may determine, based on the geographic data received at block 506, whether the first image(s) from the first headset and the second image(s) from the second headset were generated within a threshold non-zero time of each other within a threshold non-zero distance of each other. For example, the logic may determine whether the first image(s) and the second image(s) were generated within ten seconds of each other based on timestamp metadata associated with the respective images by each headset when generated. The logic may also determine whether the first image(s) and the second image(s) were generated within three feet of each other based on respective GPS coordinates from respective GPS transceivers on each headset that were associated with the respective images by each headset when generated. Additionally or alternatively, determining whether the physical interaction as respectively indicated in the first and second images/video streams took place at the same place may be based on the respective first and second images/video streams showing the face of the opposing party to the electronic interaction (as determined using facial recognition), thus establishing that all parties to the interaction were present when the images/video streams were generated.

A negative determination at diamond 516 may cause the logic to proceed to block 512 as described above, while an affirmative determination at diamond 516 may instead cause the logic to proceed to block 518. At block 518 the logic may, based on the affirmative determination at diamond 510, identify that the physical interaction from the first image(s) and the second image(s) is in fact a physical interaction between the first and second users and may accordingly authenticate/validate the electronic interaction identified at block 502.

Also at block 518, the logic may store in a storage area the received audio data, image data, metadata, etc. as evidence of the validated electronic interaction and consent of all involved parties. Additionally or alternatively, the evidence of the electronic interaction may be added as a block in a blockchain as a method of recording the electronic interaction.

For instance, if the electronic interaction was the trading of two video games between the first user and the second user through a particular video gaming service or digital asset management service for which the users are members, a server associated with the service may execute the logic of FIG. 5 while communicating over an encrypted communication line with the respective headsets of the users. The headsets themselves may have already been configured for accessing the service, e.g., using unique login IDs. The service may then authenticate and record the trade of the video games at block 518 in a blockchain and, execute/permit the trade using their unique login ID. Even if the logic of FIG. 5 is executed in whole or in part by one or more of the headsets themselves, the headset may communicate with the service to indicate that the trade has been authenticated and then record the trade in a block of a blockchain, which in turn may cause the service to then execute/permit the trade based on the authentication/recordation.

As described above, one way the electronic interaction may be recorded is in a block of a blockchain. For instance, the service referenced above may record the electronic interaction into a block of any cryptocurrency that might be exchanged and then the service may execute the exchange/transfer of digital assets once the electronic interaction is verified as appearing in the cryptocurrency blockchain.

Another way in which the electronic interaction may be recorded is for the respective users' headsets themselves to exchange the image(s) and related data gathered by each respective headset, peer-to-peer. The image(s) and other data (e.g., time and location metadata) from each of the headsets may even be accompanied by a respective digital signature created using its user's private key so that the receiving headset may then decrypt the data with the reciprocal public key. Once the headsets have received each other's data and validated the respective digital signatures, each headset may then take the received image(s) and other data and compare it to its own captured data to validate that both sets of data indicate the same physical interaction as described herein. The validation may also include comparing background noise in audio data from each headset to identify the same noises as being indicated in both sets of audio data, and/or identifying head movements or gestures as indicated in received image data as corresponding to head movements or gestures sensed at the respective headset itself (e.g., using a motion sensor or its own camera). Once a given headset validates, it may then send confirmation back to the other headset that it has validated a match and may also report the validation to a third party such as the service described above so that the third party can record the electronic interaction as being validated by each headset and then facilitate the electronic interaction between the two users/headsets. The electronic interaction may also be recorded at each respective headset once validated by both headsets.

Additionally or alternatively, yet another way in which the electronic interaction may be recorded is for each headset to send the image and other data as described above in encrypted form to the third party service itself (e.g., using the public key for the service), along with a digital signature created using the private key for the respective user/headset that sends the data. The service may then decrypt the data using its own private key and validate the digital signature using the sending headset's public key. The service may then validate that both sets of data indicate the same physical interaction similar to as indicated in the paragraph immediately above. Once validated, the service may then facilitate the electronic interaction through itself or provide a message to each headset indicating that the service has validated the electronic interaction so that the headsets may then complete the electronic interaction amongst themselves. Last, note in relation to this example that in some embodiments one-time encryption keys may be used as another way to provide secure communication.

Figure 6:
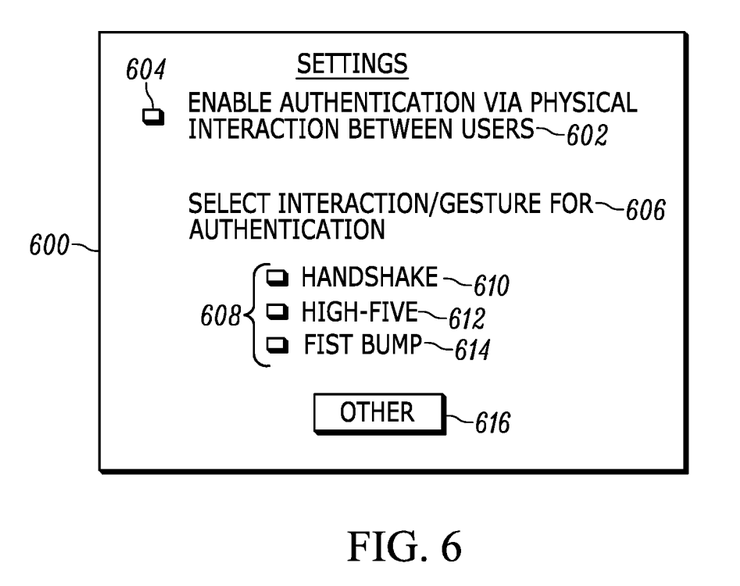

Now in reference to FIG. 6, it shows an example GUI 600 that may be presented for configuring settings of a device or software application undertaking present principles. For instance, the GUI 600 may be presented on the heads-up display of a given user's headset to configure a software application stored on the headset for undertaking present principles in conjunction with a server as described herein. The GUI 600 may include a first option 602 that is selectable by directing touch or cursor input to check box 604 to enable the headset/application to perform authentication via a physical interaction between users. For instance, the option 602 may be selected to enable the headset to undertake the logic of FIG. 5 in whole or in part.

The GUI 600 may also include a setting 606 for a user to select a particular predefined gesture as a gesture to be recognized from camera input in order to perform authentication as described herein. Respective check boxes 608 are shown, with each one being selectable to select the adjacent predefined gesture. As shown in FIG. 6, a handshake gesture 610 may be selected, as well as a high-five gesture 612 and a fist-bump gesture 614. An "other" selector 616 may also be selected, which may cause another GUI to be presented at which a user may specify still other predefined gestures other than the ones indicated on the GUI 600.

It may now be appreciated that present principles provide for a way to create evidence and authentication of a digital/electronic interaction between two or more parties to the digital interaction using the trigger of a physical interaction between the users. This in turn may improve the functionality and ease of use of a device used to perform the digital interaction in an intuitive way for the average person without the use of a complex password or a series of annoying GUIs.

It will be appreciated that whilst present principals have been described with reference to some example embodiments, these are not intended to be limiting, and that various alternative arrangements may be used to implement the subject matter claimed herein.

What is claimed is:

1. A device, comprising:
   at least one processor;
   at least one computer storage with instructions executable by at least one processor to:
   receive at least a first image and receive at least a second image;
   based at least in part on the first and second images, identify a gesture performed between a first user and a second user;
   perform authentication of at least one electronic interaction based at least in part on the identification of the gesture;
   identify the gesture performed between the first user and the second user at least in part by identifying a gesture indicated in both the first image and the second image; and
   perform the authentication based at least in part on identifying the first and second images as both being generated at a particular time that is indicated in time-related metadata.

2. The device of claim 1, wherein the authentication is in relation to exchange of a digital asset.

3. The device of claim 1, wherein the device comprises a headset.

4. A device, comprising:
   at least one processor;
   at least one computer storage with instructions executable by at least one processor to:
   receive at least a first image and receive at least a second image;
   based at least in part on the first and second images, identify a gesture performed between a first user and a second user;
   perform authentication of at least one electronic interaction based at least in part on the identification of the gesture;
   identify the gesture performed between the first user and the second user at least in part by identifying a gesture indicated in both the first image and the second image; and
   perform the authentication based at least in part on identifying the first and second images as both being generated within a threshold time of each other as indicated in time-related metadata.

5. A device, comprising:
   at least one processor;
   at least one computer storage with instructions executable by at least one processor to:
   receive at least a first image and receive at least a second image;
   based at least in part on the first and second images, identify a gesture performed between a first user and a second user;
   perform authentication of at least one electronic interaction based at least in part on the identification of the gesture;
   perform authentication at least in part by identifying the first image and the second image as being generated at a same location.

6. A device, comprising:
   at least one processor;
   at least one computer storage with instructions executable by at least one processor to:
   receive at least a first image and receive at least a second image;
   based at least in part on the first and second images, identify a gesture performed between a first user and a second user;
   perform authentication of at least one electronic interaction based at least in part on the identification of the gesture;

perform authentication at least in part by identifying the first image and the second image as being generated by respective devices while within a distance of each other.

7. A device, comprising:
at least one processor;
at least one computer storage with instructions executable by at least one processor to:
receive at least a first image and receive at least a second image;
based at least in part on the first and second images, identify a gesture performed between a first user and a second user;
perform authentication of at least one electronic interaction based at least in part on the identification of the gesture;
perform authentication at least in part by identifying the first image and the second images as showing a same physical interaction between the first and second users from different angles.

8. The device of claim 7, wherein the physical interaction comprises a handshake between the first user and the second user.

9. The device of claim 7, wherein the physical interaction comprises a high-five between the first user and the second user.

10. A device, comprising:
at least one processor;
at least one computer storage with instructions executable by at least one processor to:
receive at least a first image and receive at least a second image;
based at least in part on the first and second images, identify a gesture performed between a first user and a second user;
perform authentication of at least one electronic interaction based at least in part on the identification of the gesture;
wherein the device is a first device comprising a server, wherein the server is configured to communicate with a second device associated with the first user and from which the first image is received, and wherein the server is configured to communicate with a third device associated with the second user and from which the second image is received.

* * * * *